Patented Apr. 19, 1932

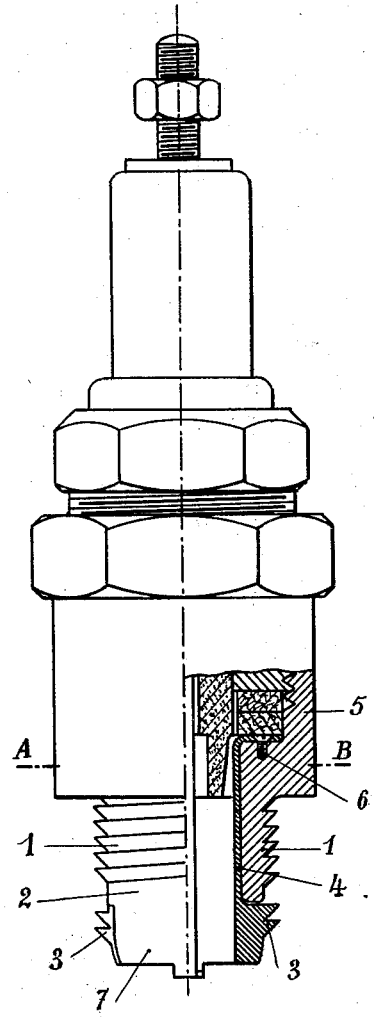
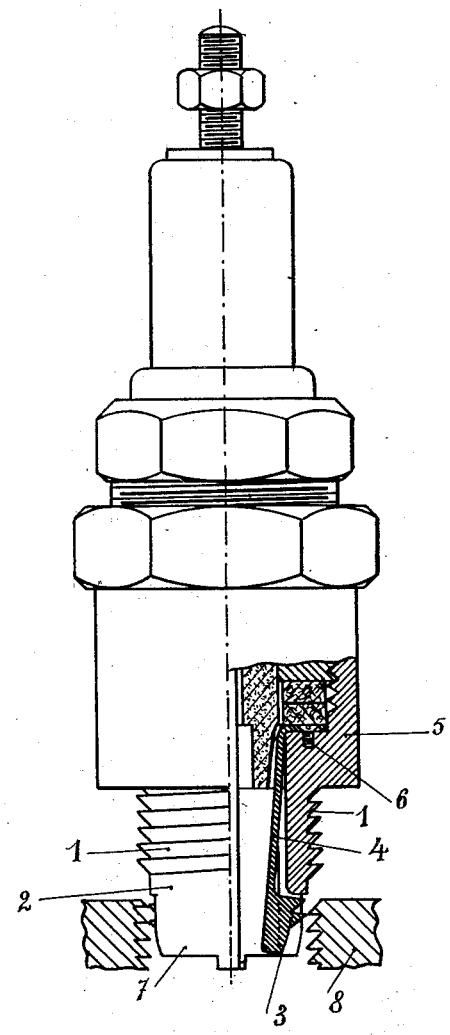
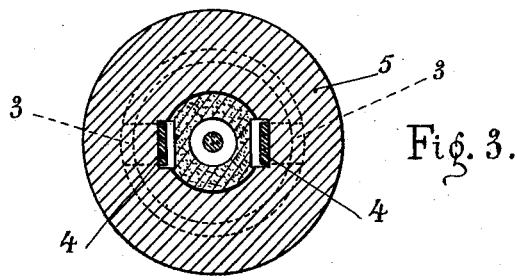

1,854,674

UNITED STATES PATENT OFFICE

RAYMOND SAVON, OF MARSEILLE, FRANCE

SCREW THREADED PRESSURE RESISTING COUPLING

Application filed May 4, 1929, Serial No. 360,402, and in France April 4, 1929.

In apparatus where there is an internal pressure, there is always a number of parts which need inspection or replacement during the running of such apparatus. Generally the parts which have to be dismantled are screwed together and this always requires the stoppage of the main apparatus when an examination is needed because the internal pressure renders the re-assembly of the part very difficult; the dismantling not giving any particular difficulty.

In particular the replacement of the spark plug of an internal combustion engine when running has dangerous risks, particularly in aviation where the immediate replacement of a spark plug may frequently avoid a serious mishap.

The present invention has for object a system of screw threading adaptable to all mechanical parts and particularly to spark plugs of an internal combustion engine, permitting the correct fitting during running and without risk of being blown outwardly of the member constructed according to this principle.

To show a practical application without limiting the scope of the invention, the accompanying drawings show the arrangement applied to the spark plug of an internal combustion engine.

Fig. 1 is a part sectional elevation showing the normal arrangement at rest or in place. Fig. 2 is a part vertical section showing the arrangement during its introduction into the screw threaded housing which it has to occupy. Fig. 3 is a section taken on the line A—B of Fig. 1.

In detail the arrangement comprises: a screw threaded part 1, the special thread of which in the form of a rectangular triangle, has its face, which is perpendicular to the axis, so arranged that the effort of tightening occurs on this part. In the example shown the edge of the tooth which is normal to the axis is at the top and the inclined edge below.

The screw thread 1 is continued by a cylindrical bore portion 2 in which engage two fractions of screw thread 3, carried on resilient blades 4 secured to the body 5 of the apparatus by appropriate means such as a screw 6 or a rivet if desired. It is obvious that the space comprised between the last thread of the portion 1 and the fractions of thread 3 is a multiple of the thread that is to say these fractions 3 are the normal continuation of the thread 1. The end of the bore 2 as also the fractions of threads 3 are terminated by a slightly rounded shape 7 which allows of the rapid centering of the part to be screwed up.

In normal position of rest or in place in its housing the whole takes up the position of Fig. 1, that is to say the parts 1 and 3 acting together on the part forming the nut.

To fit the spark plug (Fig. 2) according to the example shown, it suffices to press in without turning the ends 7 and 3 in the nut 8. The fractions of screw thread 3 are pushed backwards in the bore 2 by reason of the shape of the threads which form an inclined plane, and then return to normal position, through the intervention of the spring 4, as soon as the screw threads 3 fall into the corresponding gaps in the nut 8. At this moment the spark plug is held by the teeth and no internal pressure can eject it; as the thrust takes place on the parts of the screw thread which are perpendicular to the axis it suffices to then tighten up for the plug to screw home without effort.

I claim:

A screw thread having an edge perpendicular to the axis of the member carrying said thread and an edge angularly disposed to said perpendicular edge, two fractions of screw threads having the same pitch as the main screw thread, two resilient blades carrying said fractions disposed interiorly of said main screw thread adapted to carry said fractions, means for securing said blades, said fractions of screw threads being disposed at a distance from the main screw thread and adapted for the member carrying same to be inserted in a reception hole by pressure.

RAYMOND SAVON.